J. H. BAIR.
COOLING MEANS FOR ROTARY INTERNAL COMBUSTION ENGINES.
APPLICATION FILED APR. 30, 1919.
1,331,177.
Patented Feb. 17, 1920.
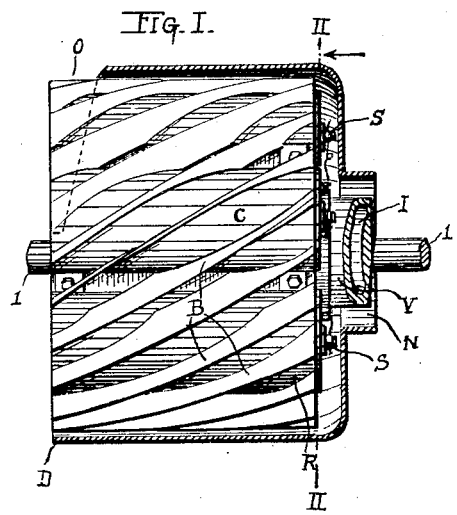
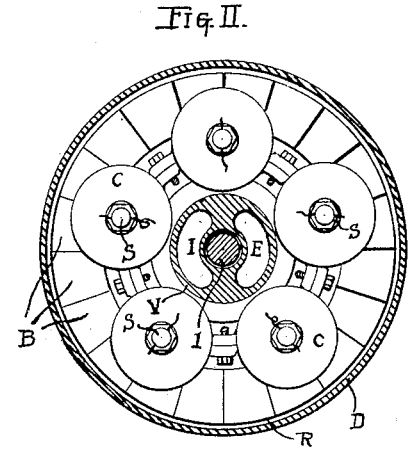
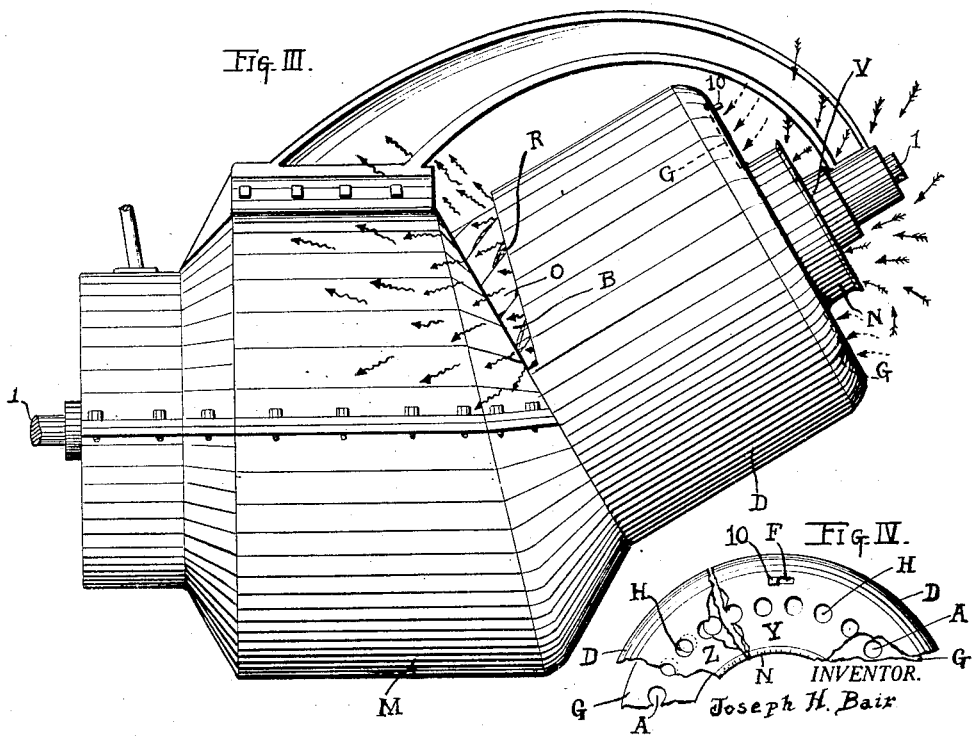
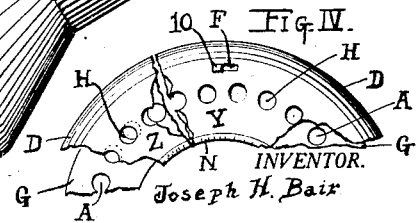
INVENTOR.
Joseph H. Bair
BY
Augustus B. Stoughton
ATTORNEY.

UNITED STATES PATENT OFFICE.

JOSEPH H. BAIR, OF HADDONFIELD, NEW JERSEY.

COOLING MEANS FOR ROTARY INTERNAL-COMBUSTION ENGINES.

1,331,177.      Specification of Letters Patent.      Patented Feb. 17, 1920.

Application filed April 30, 1919. Serial No. 293,717.

*To all whom it may concern:*

Be it known that I, JOSEPH H. BAIR, a citizen of the United States, residing at Haddonfield, in the county of Camden and State of New Jersey, have invented certain new and useful Improvements in Cooling Means for Rotary Internal-Combustion Engines, of which the following is a specification.

The invention relates to cooling means and more particularly to that class employing a blast of cold air to be drawn over the heat conducting flanges of an internal combustion cylinder and over the flanges of the exhaust mechanism.

The primary object of the invention is to procure in the simplest possible manner an efficient cooling means for a rotary explosion engine where the cylinders lie parallel with the shaft of rotation. To this end I employ radially distending spiral flanges or blades, surrounding the rotor embracing the parallel cylinders and in heat radiating contact therewith, and a drum or sleeve encompassing said rotor. This drum incases the rotor more or less snugly so that when it revolves a blast of air is sucked therethrough, by means of the spiral pitch of the blades. The cold air drawn thus rapidly along between these heat conducting blades convects the heat of explosion and of work to the air which carries it off at the exit end of the drum. The sleeve surrounding the rotor is preferably contracted at the forward (or air intake) end into a funnel-like sleeve which surrounds the intake-exhaust valve and for which it also provides cooling means. The exhaust valve projecting forward beyond the rotor can also have cooling flanges or pins. These flanges are preferably parallel with the axis of rotation and radially distending so that they offer the largest cooling surface but least obstruction to the intake suction. The most economical structure to accomplish this is more or less obvious and is therefore not shown in the drawings.

At the exhaust end may be a radial opening embracing only a part of the circumference (of the drum) as disclosed in the drawings. This will prevent any leakage of oil which may drop on the bottom and allow it to return by means of the incline into the sump.

Referring now to the drawings,

Figure I, is a side view of the rotor, embracing the cylinders parallel with the axis thereof, surrounded by the spiral flanges. The surrounding drum and the intake-exhaust valve are cut away and partly in section so as to show to advantage the structure.

Fig. II, is a section on the line II—II of Fig. I, looking in the direction of the arrow.

Fig. III, is a side view of the engine in operation showing by arrows the intake of cold air and the exhaust of the heated air. The broken arrows show control intake.

Fig. IV, represents fragmentary front views of the casing D—N, showing a series of holes therein and a shiftable underlying plate with a corresponding series to register therewith. Fragment Z shows partial registration and fragment Y complete registration.

1, is the shaft of rotation. This shaft has a bend by means of which the bevel gear on the rotor R, and that on the driven member mounted respectively on the two axes of this shaft are meshed. M, is the casing and D, the sleeve surrounding the rotor. At its forward end is a contracted part N, to conform to the exhaust valve V. B, are the spiral blades on the rotor R, which includes the cylinders C, having spark plugs S, thereon. The valve V, having an intake compartment I, and an exhaust compartment E, extends into the rotor and coöperates with it in the timing requirements. It also extends forward through the sleeve N, and in operative connection with the carbureter and exhaust pipe respectively. This connection is not shown. The blast of hot air leaves the rotor by means of the semicircular opening O.

In the casing in the plane disk part connecting the larger sleeve E, and the neck N, thereof may be a series of openings H, and a turnable disk G, superposed thereon. This disk has openings A, to register with those in the casing. By means of its relative shiftableness any degree of registration can be had from complete superposition of the holes to entire closure by means of the pin 10, in limiting slot F. In this way the amount of air intake at the neck N, can be controlled in a manner requiring no further description.

I claim:

1. A rotary internal combustion engine having in combination a rotor carrying the cylinders, spiral flanges for the rotor, and a cover sleeve surrounding the flanges, the construction operating as a suction fan.

2. A rotary internal combustion engine having in combination a rotor carrying the cylinders, spiral flanges for the rotor, a valve arranged at the intake end of the rotor, a cover sleeve surrounding the flanges and provided with an open ended neck surrounding the valve and through which cooling air is drawn by the suction of the fan.

3. A rotary internal combustion engine having in combination a rotor, spiral flanges for the rotor, a gear casing for the engine, and a cover sleeve for the flanges constituting a continuation of the casing at the lower part thereof and providing an air outlet at the upper part thereof.

4. A rotary internal combustion engine having in combination a rotor, spiral flanges for the rotor, a gear casing for the engine, a cover sleeve for the flange provided with an open ended neck and constituting a continuation of the casing at the lower part thereof and providing an air outlet at the upper part thereof, and a valve arranged in the neck.

5. A rotary internal combustion engine having in combination a rotor carrying the cylinders, spiral flanges for the rotor, a valve arranged at the intake end of the rotor, a cover sleeve surrounding the flanges and provided with an open ended neck surrounding the valve and through which cooling air is drawn by the suction of the fan, and regulatable means for admitting air through the end of the casing.

JOSEPH H. BAIR.